(12) United States Patent
van der Meijden

(10) Patent No.: US 9,488,154 B2
(45) Date of Patent: Nov. 8, 2016

(54) HYDRAULIC SWIMMING POOL CLEANERS WITH ELECTRICITY GENERATORS

(71) Applicant: ZODIAC POOL SYSTEMS, INC., Vista, CA (US)

(72) Inventor: Hendrikus Johannes van der Meijden, Midrand (ZA)

(73) Assignee: ZODIAC POOL SYSTEMS, INC., Vista, CA (US)

( * ) Notice: Subject to any disclaimer, the term of this patent is extended or adjusted under 35 U.S.C. 154(b) by 129 days.

(21) Appl. No.: 14/205,408

(22) Filed: Mar. 12, 2014

(65) Prior Publication Data

US 2014/0259465 A1 Sep. 18, 2014

Related U.S. Application Data

(60) Provisional application No. 61/779,733, filed on Mar. 13, 2013.

(51) Int. Cl.
*F03B 13/10* (2006.01)
*E04H 4/16* (2006.01)

(52) U.S. Cl.
CPC ............... *F03B 13/10* (2013.01); *E04H 4/16* (2013.01); *E04H 4/1663* (2013.01)

(58) Field of Classification Search
CPC .................................. F03B 13/10; E04H 4/16
See application file for complete search history.

(56) References Cited

U.S. PATENT DOCUMENTS

| 4,642,833 | A | * | 2/1987 | Stoltz et al. ..................... 15/1.7 |
| 4,742,593 | A |  | 5/1988 | Kallenbach |
| 7,618,019 | B2 |  | 11/2009 | Van Der Meijden |
| 8,100,146 | B2 |  | 1/2012 | Van Der Meijden |
| 2011/0057449 | A1 | * | 3/2011 | Marya et al. .................. 290/54 |
| 2011/0064626 | A1 | * | 3/2011 | Kennedy ....................... 422/243 |
| 2011/0226361 | A1 | * | 9/2011 | Van Der Meijden et al. ....................... 137/565.11 |
| 2012/0110727 | A1 | * | 5/2012 | Uy et al. ........................... 4/494 |
| 2012/0211995 | A1 | * | 8/2012 | McQueen et al. ............. 290/1 R |

FOREIGN PATENT DOCUMENTS

WO 02068778 A1 9/2002
WO 2012115915 A1 8/2012

OTHER PUBLICATIONS

International Search Report and Written Opinion dated Aug. 26, 2014 in Application No. PCT/US2014/023846.

* cited by examiner

*Primary Examiner* — Tulsidas C Patel
*Assistant Examiner* — Sean Gugger
(74) *Attorney, Agent, or Firm* — Dean W. Russell; Kilpatrick Townsend & Stockton LLP

(57) ABSTRACT

Generation of electricity on-board, principally, certain hydraulic pool cleaners is described. Magnets may be caused to move within coils by (normal) cooperative actions of diaphragm-type valves and external pumps, thus generating electricity without changing the operational principles of the cleaners. The generated electricity may be used to power electrical devices either on-board the cleaners or elsewhere.

13 Claims, 4 Drawing Sheets

HYDRAULIC SWIMMING POOL CLEANERS WITH ELECTRICITY GENERATORS

CROSS-REFERENCE TO RELATED APPLICATION

This application claims the benefit of and priority to U.S. Provisional Patent Application No. 61/779,733, filed Mar. 13, 2013, entitled "Hydraulic Oscillating Power Generator," the entire contents of which are incorporated herein by this reference.

FIELD OF THE INVENTION

This invention relates to generating electricity and more particularly, although not necessarily exclusively, to automatic hydraulic cleaners for swimming pools and spas in which electricity is generated via oscillation of a magnet within a coil.

BACKGROUND OF THE INVENTION

Conventionally, an automatic pool cleaner ("APC") may be considered either "hydraulic" or "electric" depending on the source of energy employed to effect its movement within a pool, spa, or other water-containing vessel. "Electric" cleaners, sometimes also called "robots," typically use electricity to power motors used to drive wheels or treads to allow the cleaners to move throughout the vessel. Although on-board batteries are sometimes considered to supply electricity to the robots, more likely electricity from mains outside the vessels is conveyed via electrical cords to the robots within the vessels.

"Hydraulic" cleaners, by contrast, connect to external pumps and utilize water flow caused by operation of the pumps to effect their movement within a pool or spa. Some hydraulic cleaners connect to pump outlets; these devices are called "pressure-side" APCs, as pressurized water from pump outlets typically drives the cleaners. Alternatively, hydraulic cleaners may connect to inlets of pumps. These "suction-side" cleaners often include valves and supporting structure designed periodically to interrupt water flow through their bodies to the pumps. Periodic flow interruption creates a "water-hammer" effect, with the resulting energy used to move the APCs within pools.

U.S. Pat. No. 4,742,593 to Kallenbach discloses exemplary valves useful in water-interruption, suction-side hydraulic APCs. A flexible-walled, "diaphragm" valve of the Kallenbach patent may be placed within a chamber of a body of an APC, with the chamber filling with water upon immersion of the APC within a pool. As noted therein:

> Expansion of the valve and release for it to reassume its relaxed condition is by the creation of a pressure differential across the valve member walls, i.e., a pressure difference between the chamber and the interior of the valve member. This is created by the suction [of the external pump]. The valve is autonomously opened and closed. Applied suction initially causes the valve to open; but with water flow established, the pressure within [the] valve drops below that of [the] chamber. The valve thus closes. The cycle autonomously repeats.

See Kallenbach at col. 2, 1. 64 to col. 3, 1. 6 (numerals omitted).

Similar water-interruption valves and associated structures are illustrated in U.S. Pat. No. 4,642,833 to Stoltz, et al. Like the valves of the Kallenbach patent, those of the Stoltz patent are positioned within chambers. In at least some embodiments of the Stoltz patent, water may flow into and out of the chambers via ports communicating with flow passages though the valves. See, e.g., Stoltz at col. 3, 11.8-21.

Historically, hydraulic cleaners—and especially suction-side, water-interruption APCs—have been entirely mechanical devices, operating without any need for electricity. As electronic processors (and other electric devices) decrease in cost, weight, and size, however, hydraulic cleaners could benefit from on-board inclusion of these processors and devices. Inclusion requires a supply of electricity, however, just as is required currently for electric cleaners. Such supply could, of course, likewise be provided by electric mains via a cord or perhaps by an on-board battery or turbine. Each of these approaches is disadvantageous in at least some respects, however.

SUMMARY OF THE INVENTION

The present invention permits electricity generation on-board hydraulic APCs while avoiding disadvantages associated with existing means for supplying electricity to (principally electric) cleaners. No abnormal disruption of the primary water flow though water-interruption cleaners need occur in order to generate electricity, for example, thus both avoiding any increased risk of clogging the associated valves with debris and maintaining the operational effectiveness of the valves. The invention also avoids problems associated with weight and recharging of on-board batteries and does not mandate any reduction in integrity of any electronics enclosure that might otherwise be caused by mechanical arms, rotating axles, or levers of impellers or turbines.

Equally significant is that the present invention exploits the fact that, in certain water-interruption APCs, the valves and external pumps normally cause movement (of water) within the chambers associated with the valves. Rather than move only water within the chambers, the present invention moves one or more magnets as well. By placing wire coils outside the chambers, movement (oscillation) of the magnets may generate electricity through otherwise normal operation of the cleaners. The generated electricity preferably is used to power electrical devices (e.g. processors) on-board the cleaners, so as to increase their "intelligence," although other devices either on-board or remote from the cleaners may also or alternatively be powered.

It thus is an optional, non-exclusive object of the present invention to provide improved cleaners of swimming pools, spas, and other water-containing vessels (hereinafter sometimes separately or collectively referred to as "pools" or "swimming pools").

It is another optional, non-exclusive object of the present invention to provide mechanisms for generating electricity on-board hydraulic pool cleaners.

It is also an optional, non-exclusive object of the present invention to provide electricity-generating mechanisms involving one or more magnets moving within one or more coils forming parts of APCs.

It is a further optional, non-exclusive object of the present invention to provide movement of magnets as part of the normal operating principles of at least certain water-interruption cleaners.

Other objects, features, and advantages of the present invention will be apparent to those skilled in appropriate fields with reference to the remaining text and drawings of this application.

DETAILED DESCRIPTION

Figure 1:
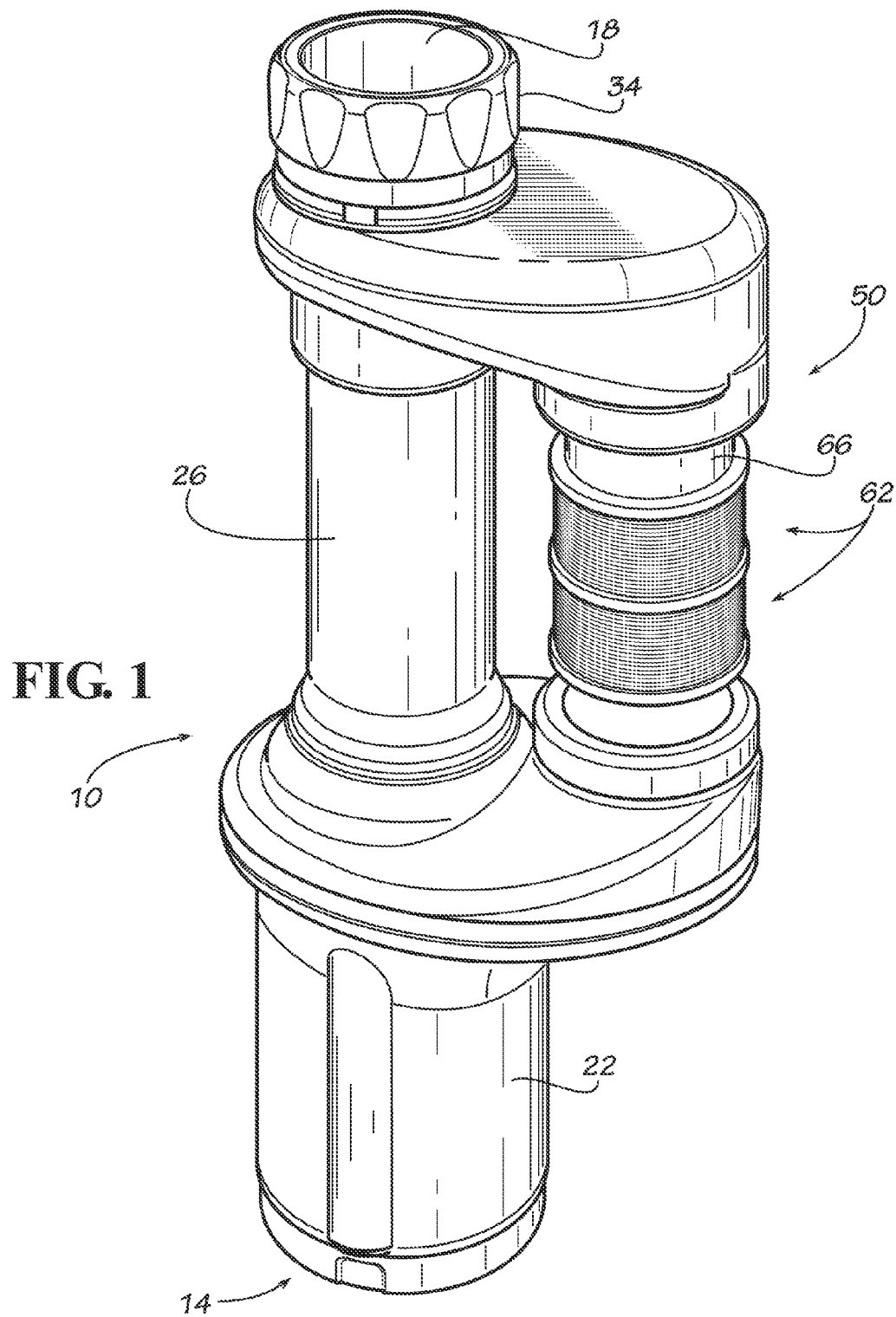
FIG. 1 is a perspective view of portions of an exemplary pool cleaner of the present invention.

Illustrated in FIGS. 1-4 is body 10 consistent with the present invention. Body 10 may form part or all of a body of a pool cleaner such as a hydraulic, suction-side APC. If desired, for example, body 10 may substitute for corresponding structure of the disc cleaners disclosed in the Kallenbach and Stoltz patents. Body 10 may include inlet 14 and outlet 18; in use as a suction-side APC, body 10 receives debris-laden water via inlet 14 and passes the water out outlet 18 for transfer to a hose, and thence to a debris filter, connected to the inlet side of a pump of a water-recirculation system associated with a pool or spa.

Body 10 preferably (but not necessarily) is formed of molded plastic material and comprises nominally lower and upper sections 22 and 26, respectively. Advantageously, upper section 26 is a rigid cylindrical tube, while lower section 22 houses valve 30 in whole or in part. Those skilled in the art will, of course, recognize that upper section 26 need not necessarily be cylindrical or tubular in shape, and valve 30 may be housed other than in lower section 22. As shown particularly in FIG. 1, upper section 26 beneficially may terminate, at outlet 18, with a nut 34 or other structure intended to facilitate connection of body 10 to a hose or other structure.

Figure 2:
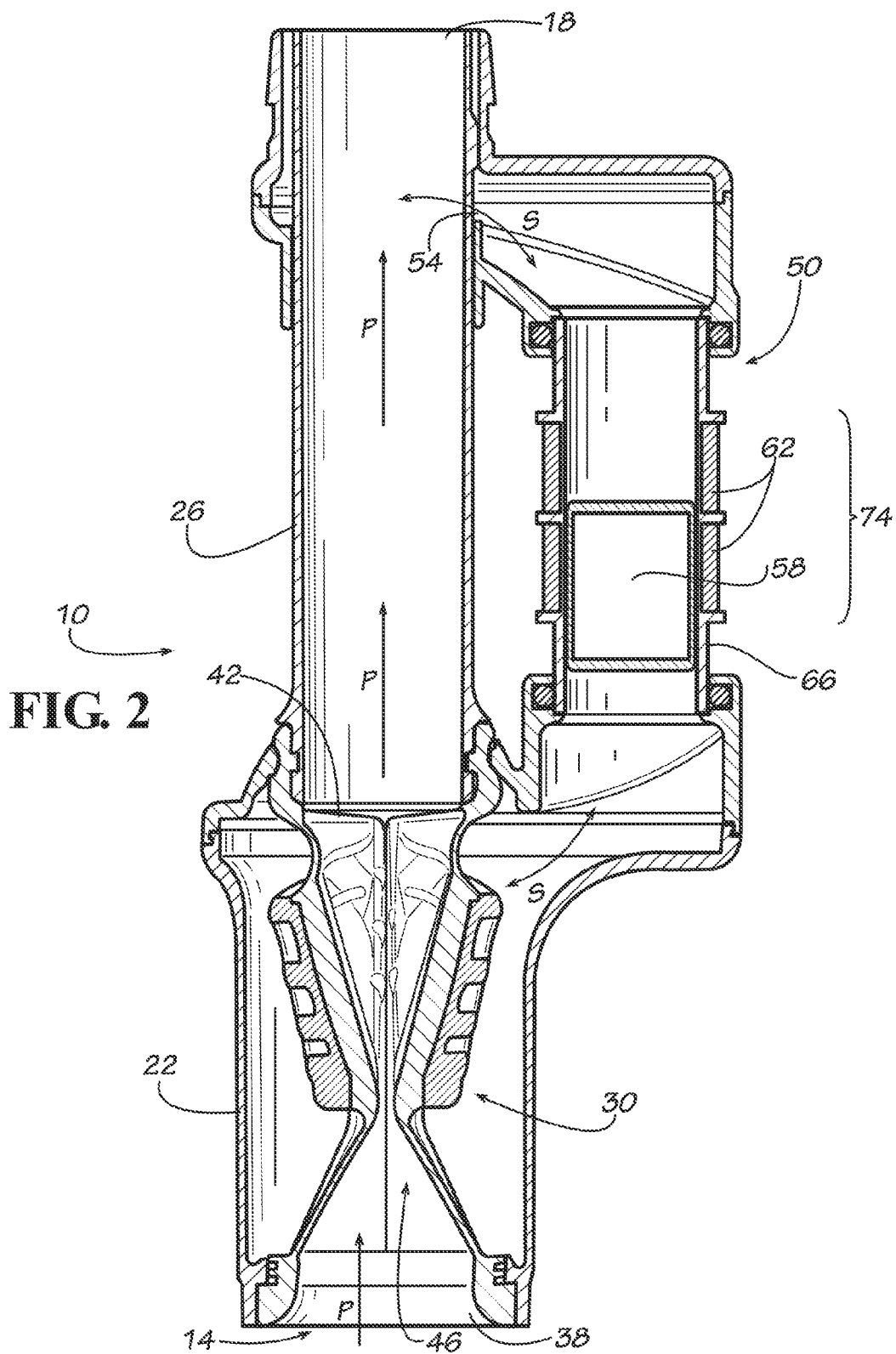
FIGS. 2-3 are cross-sectional views of the portions of the exemplary pool cleaner of FIG. 1.
Figure 3:
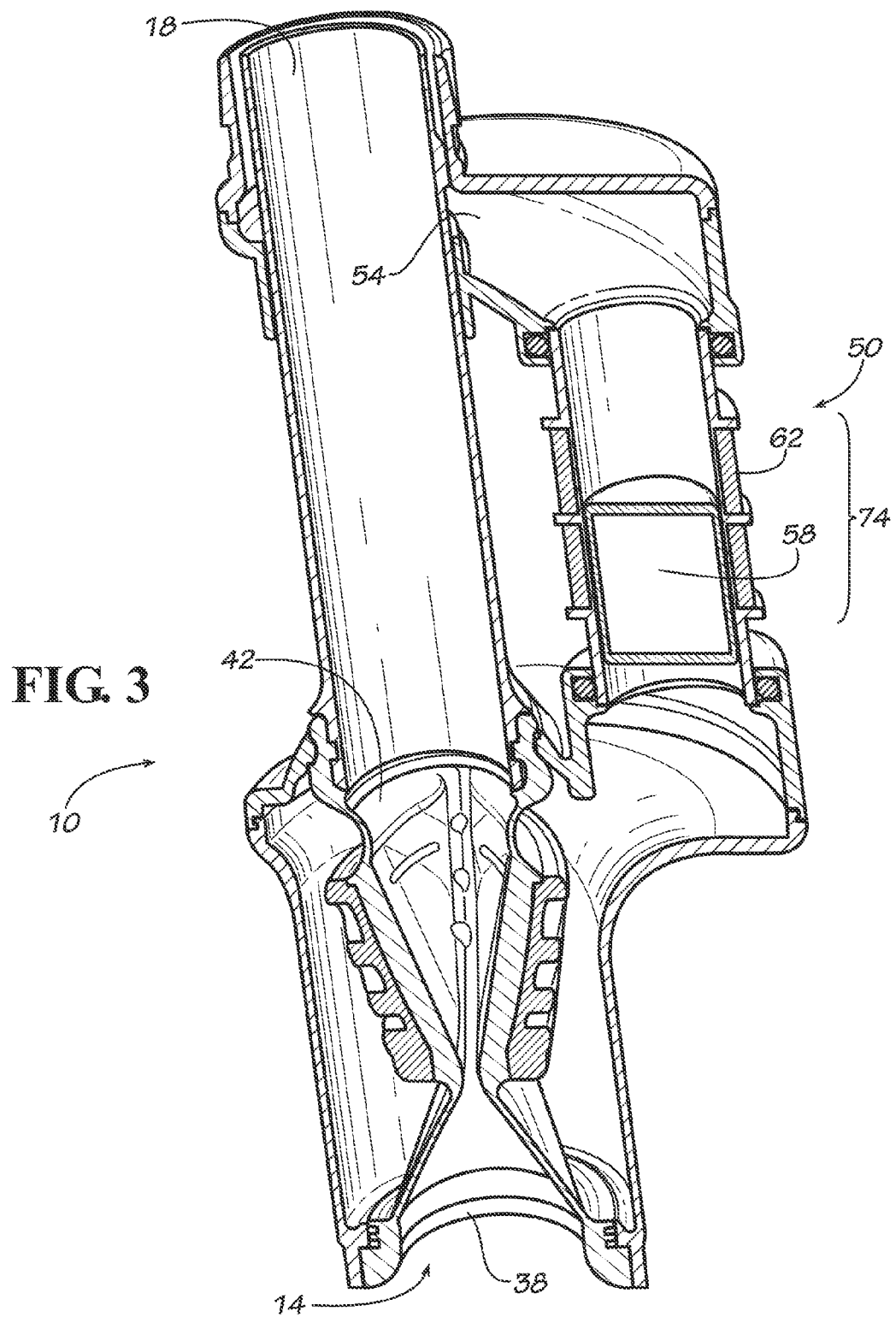

A preferred valve 30 is a flexible-walled diaphragm valve similar or identical to any of those depicted in the Kallenbach and Stoltz patents. Alternatively, valve 30 may be a diaphragm valve of the type detailed in either of U.S. Pat. No. 7,618,019 or 8,100,146 to van der Meijden, et al. or otherwise. As shown in FIGS. 2-3, valve 30 may have valve inlet 38 and valve outlet 42 and define an internal water flow path 46 therethrough. Valve 30 is depicted as being connected, via flanges and grooves (or otherwise as desired), to both lower section 22 (at inlet 14 and valve inlet 38) and upper section 26 (at valve outlet 42).

In use, body 10 and valve 30 form a primary flow path P for debris-laden water. Under influence of the external pump, such water enters inlet 14, travels through the interior of valve 30 along internal water flow path 46, and exits upper section 26 at outlet 18. When valve 30 mainly or completely closes, primary flow path P is interrupted, producing the water-hammer effect that causes movement of body 10 within the pool or spa.

Additionally defined by body 10 is secondary flow path S. Secondary flow path S exists through connector 50 and lower section 22 externally of valve 30. However, because of the sealing connection of valve 30 and lower section 22, secondary flow path S is isolated from inlet 14 and valve inlet 38. Connector 50 and lower section 22 externally of valve 30 thus collectively form a "chamber" similar to the chambers described in the Kallenbach and Stoltz patents, with connector 50 including a port 54 allowing fluid communication between it and upper section 26.

Conventionally, (only) water is present within the chamber formed by connector 50 and lower section 22 externally of valve 30, entering through a leakage path or otherwise upon submersion of body 10. When body 10 of the APC is immersed in water and the external pump is activated, less than ambient pressure is present at outlet 18. This partial evacuation of body 10 causes debris-laden water to flow along primary flow path P until diaphragm valve 30 collapses. As valve 30 collapses it forms greater resistance to water flow along primary path P; influence of the pump causes water in the chamber to flow along secondary path S toward port 54, hence forcing valve 30 to open. As valve 30 reopens, water again flows along primary flow path P, creating the cyclical results identified in the Kallenbach patent.

Opening of valve 30 additionally causes water to flow away from port 54 (toward lower section 22) in the secondary flow path S. Thus, clear is that secondary path S is bi-directional, with water oscillating toward and away from port 54 within the chamber formed by connector 50 and lower section 22 externally of valve 30. Shown especially in FIGS. 2-3 is that at least one magnet 58 may be positioned within the chamber (displacing some water). By so positioning magnet 58, it too is subject to oscillation as valve 30 opens and closes. In one version of the invention magnet 58 oscillates at 5.8 Hz, although other frequencies are acceptable.

As depicted, magnet 58 is a solid mass with width slightly smaller than the diameter of connector 50, allowing it to move generally longitudinally therein without substantial friction yet preventing much lateral movement. In this case magnet 58 advantageously may (but need not necessarily) be coated with a hard-wearing material to protect it from wear and corrosion. Alternatively, magnet 58 may be solid or particulate material within a container whose width is slightly smaller than the diameter of connector 50. Bends, stops, or other structural features of connector 50 or lower section 22 (or both) may define a maximum travel distance of magnet 58 within the chamber. In the depicted version of body 10, magnet 58 remains within connector 50 so as not to impact valve 30. Magnet 58 need not necessarily always remain within connector 50, although it preferably should not intersect or disrupt the primary flow path P of water and debris.

Figure 4:
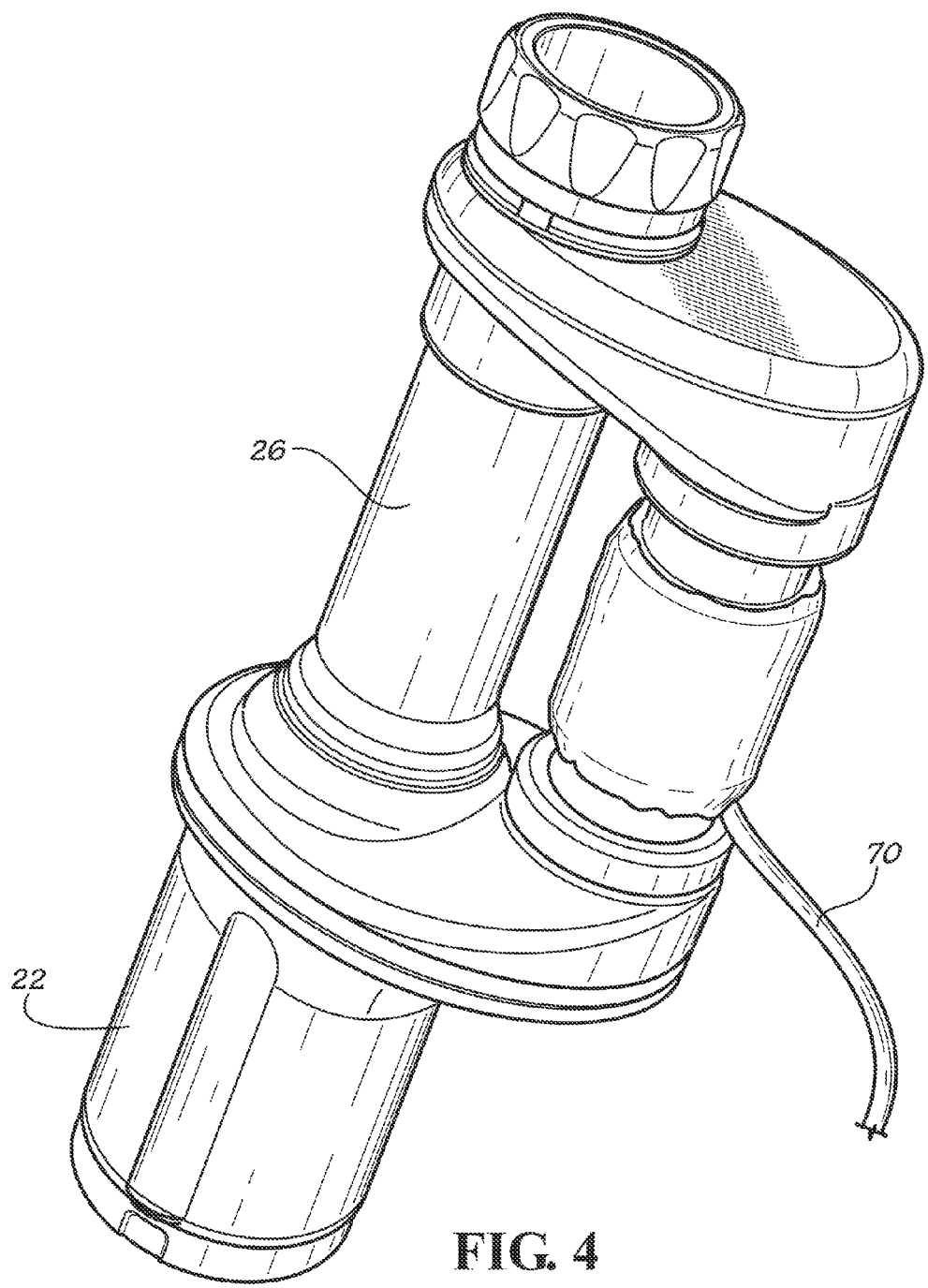
FIG. 4 is a perspective view of the portions of the exemplary pool cleaner of FIG. 1 also showing a wire or other electricity-conveying member.

One or more coils 62 may be wound or positioned about exterior 66 of connector 50, hence effectively surrounding magnet 58. As magnet 58 travels generally longitudinally within connector 50, it cooperates with coils 62 in conventional manner to produce electricity. FIG. 4 illustrates cable 70 which may house output wires conveying the generated electricity either elsewhere within body 10 or elsewhere. The generated electricity may be rectified if desired and, for example, collected in batteries or capacitors. Presently-preferred embodiments of the invention contemplate using the generated electricity to power processors, lights, steering mechanisms, or other equipment on-board body 10 of an APC. The electrically-powered equipment may perform numerous functions, non-limiting examples of which include enabling better cleaning coverage of pool floors and walls and recognizing and steering to seek particular debris within a pool.

Magnet 58 and coil 62 thus form an exemplary electricity generator 74 that is outside primary flow path P and thus does not negatively impact debris collection by body 10. Generator 74 requires no dedicated secondary flow to operate, instead exploiting existing back-and-forth water movement in secondary flow path S. Generator 74 functions regardless of orientation of valve 30, and transfers mechanical action to electrical energy through connector 50 of body 10 without need for openings and seals that are prone to wear and leakage.

Additionally, because magnet 58 likely is substantially heavier than the water it displaces, the outer water column corresponding to secondary flow path S may be shortened. In some embodiments of the invention, magnet 58 is approximately seven times heavier than the displaced water, allowing the outer water column to be shortened by a length approximately seven times the length of magnet 58 yet maintain the same pulsation frequency in valve 30. This advantage of the invention exists regardless of whether magnet 58 produces electricity; indeed, it may be achieved by placement in connector 50 of some other non-magnetic mass heavier than water.

The foregoing is provided for purposes of illustrating, explaining, and describing embodiments of the present invention. Modifications and adaptations to these embodiments will be apparent to those skilled in the art and may be made without departing from the scope or spirit of the invention. As an example of such modifications, persons skilled in the art will recognize that generator 74 need not necessarily comprise magnets and coils, as in some situations other mechanisms of generating electricity using movements within body 10 may be employed instead. Likewise, valve 30 or another device may be placed so as to open and close in a water flow path of a pressure-side APC. The entire contents of the Kallenbach, Stoltz, and both van der Meijden patents are incorporated herein by this reference.

What is claimed is:

1. A method of generating electricity by an automatic swimming pool cleaner having a body including (i) an inlet for receiving water and (ii) an outlet, the method comprising:
   a. placing the cleaner in fluid communication with a pump external to the cleaner; and
   b. operating the pump so as to cause water to flow through a valve positioned in a first water flow path between the inlet and the outlet of the body, cooperation of the valve and pump resulting in oscillatory movement of a magnet positioned in a second water flow path of the body to generate electricity in a coil that is stationary relative to the body.

2. A method according to claim 1 further comprising causing the generated electricity to be conveyed to an electric device for operation thereof.

3. A method according to claim 2 in which the electric device is on-board the cleaner.

4. A method according to claim 3 in which the electric device affects movement or steering of the cleaner within a swimming pool containing debris-laden water.

5. A method according to claim 2 in which the electric device is remote from the cleaner.

6. A method according to claim 5 in which the electric device affects movement or steering of the cleaner within a swimming pool containing debris-laden water.

7. A method according to claim 1 in which the cleaner is placed in fluid communication with an inlet of the pump and debris-laden water is drawn through the valve when the pump is operated.

8. An automatic swimming pool cleaner comprising:
   a. a body (i) comprising a water inlet and a water outlet and (ii) defining (A) primary and secondary flow paths therethrough and (B) upper and lower sections;
   b. a valve forming part of the primary flow path, at least a portion of the upper section being upstream of the valve;
   c. a connector (i) allowing fluid communication between the upper and lower sections and (ii) defining at least part of the secondary flow path; and
   d. means, comprising (i) a magnet positioned in the connector and configured for oscillatory movement in the secondary flow path and (ii) a coil (A) stationary relative to the body and (B) cooperating with the magnet, for generating electricity upon oscillatory movement of the magnet in the secondary flow path.

9. A cleaner according to claim 8 in which the valve has an interior forming part of the primary flow path.

10. A cleaner according to claim 9 in which the valve has a wall configured to flex in use so as periodically to restrict passage of water through the primary flow path.

11. A cleaner according to claim 8 in which the valve (a) has an interior and (b) connects to the lower section so as to isolate the secondary flow path from the inlet except indirectly via the interior of the valve.

12. An automatic swimming pool cleaner comprising:
   a. a body (i) comprising (A) a water inlet and (B) a water outlet and (ii) defining (A) primary and secondary flow paths therethrough, (B) an upper section, and (C) a lower section;
   b. a valve (i) having an interior forming part of the primary flow path, (ii) having a wall configured to flex in use so as periodically to restrict passage of water through the primary flow path, and (iii) connected to the lower section so as to isolate the secondary flow path from the inlet except indirectly via the interior of the valve;
   c. a connector (i) allowing fluid communication between the upper and lower sections and (ii) defining at least part of the secondary flow path;
   d. a magnet (i) positioned within the connector and (ii) configured for oscillatory movement in the secondary flow path; and
   e. a coil (i) positioned outside the connector and stationary relative to the body and (ii) configured to cooperate with the magnet so as to generate electricity when the magnet moves in the secondary flow path.

13. A method according to claim 1 in which the magnet is disconnected from the valve.

* * * * *